Figure 1:
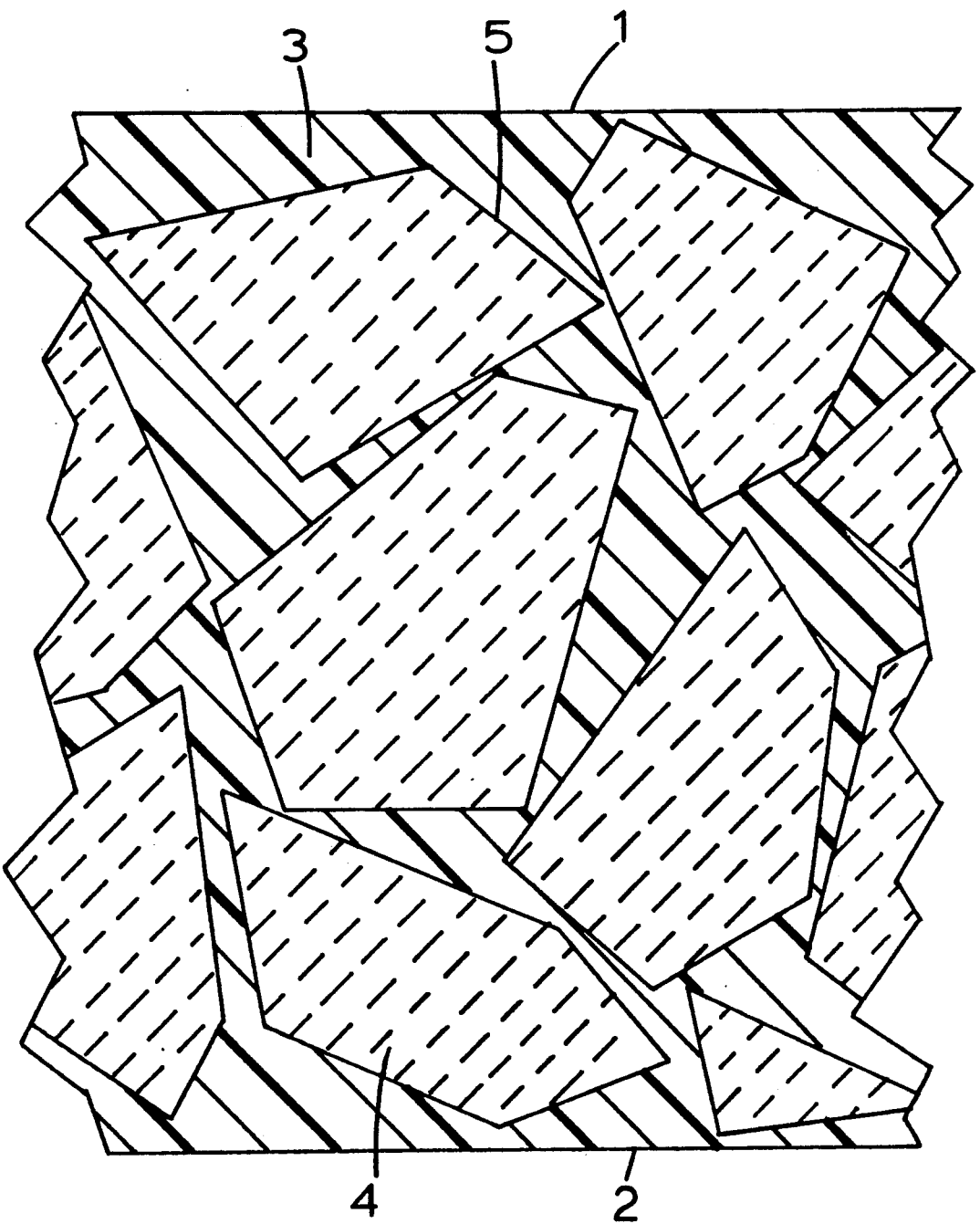

United States Patent [19]
Neefe

[11] Patent Number: 5,129,587
[45] Date of Patent: * Jul. 14, 1992

[54] METHOD OF MAKING POLYSTYRENE FLUFF FROM FOAMED POLYSTYRENE

[76] Inventor: Charles W. Neefe, P.O. Box 580, Angel Fire, N. Mex. 87710

[*] Notice: The portion of the term of this patent subsequent to Aug. 20, 2008 has been disclaimed.

[21] Appl. No.: 624,658

[22] Filed: Dec. 10, 1990

[51] Int. Cl.⁵ .................................................. B02C 18/06
[52] U.S. Cl. ................................. 241/27; 241/189.1; 241/DIG. 38
[58] Field of Search ............. 427/220, 221, 375, 385.5; 428/403, 407; 264/37, 115, 122, DIG. 69; 241/27, 189.1, 280, DIG. 38

[56] References Cited

U.S. PATENT DOCUMENTS

| | | | |
|---|---|---|---|
| 2,644,772 | 7/1953 | Kaye | 427/221 |
| 3,344,212 | 9/1967 | Francis | 264/37 |
| 3,407,444 | 10/1968 | Rees | 264/37 |
| 3,607,999 | 9/1971 | Corbett et al. | 264/37 |
| 3,630,820 | 12/1971 | Leach | 264/37 |
| 3,882,912 | 5/1975 | Sybertz | 241/292.1 |
| 3,883,624 | 5/1975 | McKenzie et al. | 264/37 |
| 4,104,440 | 8/1978 | Collins | 428/402 |
| 4,225,640 | 9/1980 | Erb | 264/122 |
| 4,246,211 | 1/1981 | Kühnel | 264/37 |
| 5,041,250 | 8/1991 | Neefe | 264/DIG. 69 |

FOREIGN PATENT DOCUMENTS

| | | | |
|---|---|---|---|
| 52-13575 | 2/1977 | Japan | 264/37 |
| 53-18650 | 2/1978 | Japan | 428/403 |
| 57-34926 | 2/1982 | Japan | 264/37 |
| 61-123693 | 6/1986 | Japan | 241/DIG. 38 |

Primary Examiner—Shrive Beck
Assistant Examiner—Terry J. Owens

[57] ABSTRACT

The invention is a method of making STYROFOAM fluff from STYROFOAM. The fluff particles are torn away from the STYROFOAM by a rapidly rotating router blade. The pulling away of small pieces from the STYROFOAM provides an increased volume to the fluff.

5 Claims, 2 Drawing Sheets

METHOD OF MAKING POLYSTYRENE FLUFF FROM FOAMED POLYSTYRENE

BACKGROUND OF THE INVENTION

Polymer usage has increased yearly for the past fifty years. The types of polymers available have also increased. New polymers are introduced in the market each year; these new plastics have different physical and chemical characteristics such as melt temperature, hardness and solubility. The reuse of this multitude of plastic materials having widely different physical and chemical properties is most difficult. The separation of polymer types is impossible by visual inspection. Some polyethylene, polyacrylonitrile, polystyrene, polyesters, polyethylene terephthalate, and polypropylene look and feel much the same, but may have different melt temperatures. High density and low density polyethylene have greatly different properties. Removing labels from containers and residues from within containers is also an economically impossible task.

IN THE DRAWINGS

Figure 2:
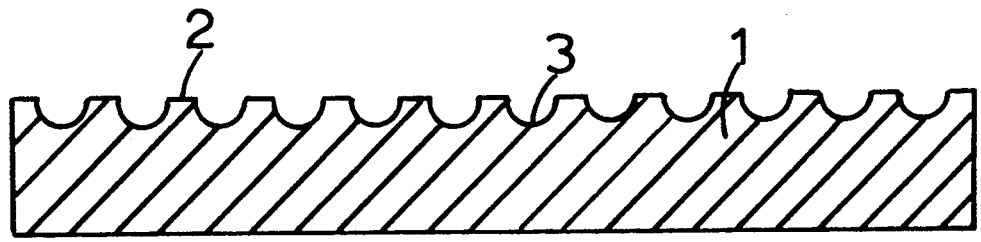
Figure 3:
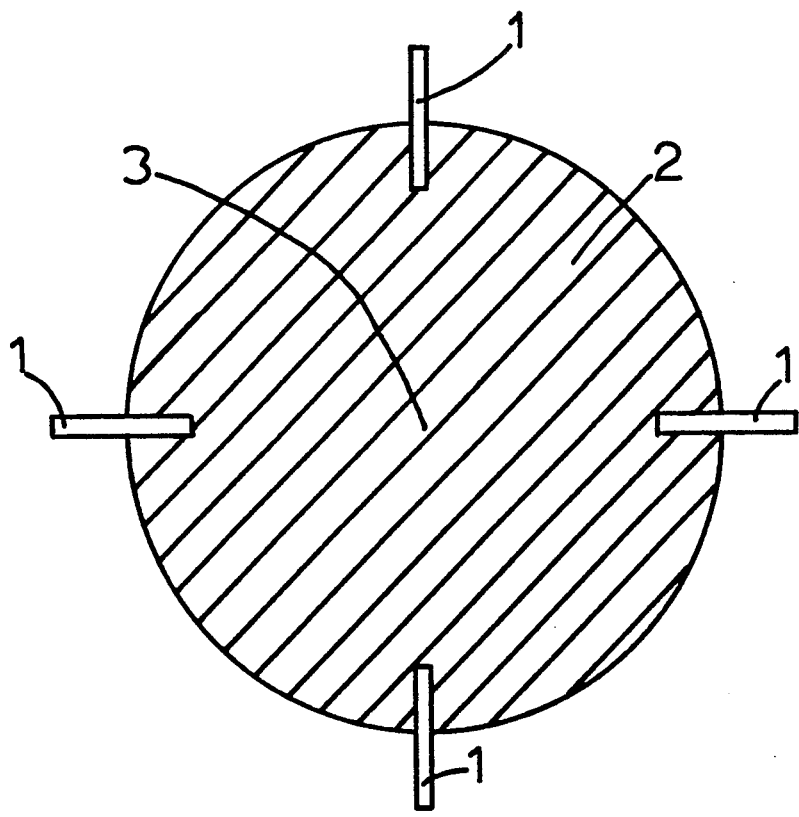

FIG. 1 shows the polymer and sand mixture in section.
FIG. 2 shows the blade.
FIG. 3 shows the blades mounted on the rotor.

SUBJECT OF THE INVENTION

A Method of preparing low density fluff from foamed polystyrene.

SUMMARY OF THE INVENTION

Low density STYROFOAM fluff is made from solid STYROFOAM by placing a STYROFOAM surface against a rapidly rotating router blade having multiple projections. The moving projections rupture the surface of the STYROFOAM and tear away small pieces of the STYROFOAM to make a low density fluff material composed of irregular shaped pieces of STYROFOAM.

TYPES OF POLYMERS USED

The most important plastics obtained by direct polymerization are also those which are the most important in terms of production volume, namely the polyolefins, the vinyl chloride polymers and the styrene polymers. These three polymers account for about 67% (polyolefins 33%, vinyl chloride polymers 20% and styrene polymers 14%) of the total annual plastic production in the West. The most important polyolefins are the polyethylenes and polypropylenes.

Thermoplastics are plastics which soften when heated but harden again when they are cooled, and this allows them to be shaped very easily. Softening and rehardening does not significantly alter the properties of a thermoplastic. As it is heated a thermoplastic first becomes elastic, like rubber, and then completely plastic, like a very viscous liquid.

Extrusion moulding, carried out in an extruder, is a common method of shaping thermoplastics. An extruder consists of a heated pressure-resistant barrel in which there is a helical screw, as in a domestic mincer (meat grinder). The screw conveys granules of the plastic through a heated die at a temperature of about 200° C. (392° F.) and a pressure of from 100 to 300 bar (1450 to 4350 psi) A wide variety of differently shaped products can be made by this method, depending on the shape of the die aperture. If it is circular, rods or filaments are produced, if it is annular, pipes and tubes are formed and if it is a slit, plastic sheeting or film will be produced. The continuous products emerging from the extruder die are cooled by air, water, cooled rollers or by contact with cooled metal surfaces which give the final exact shape to the section. The finished product is then rolled up or cut into suitable lengths.

Injection moulding is one of the most important methods of producing shaped articles in large numbers. As in an extruder, the plastic is softened by being passed along a heated barrel by means of a screw. However, the screw has the additional function of a ram, which injects the softened plastic very rapidly into a cooled steel mould at temperatures of from about 180° to 300° C. (336° to 572° F.) and pressures of 1000 bar (14,500 psi) or more, After cooling, the mould opens and the article is removed.

Blow moulding is a process used to manufacture hollow articles with small openings such as bottles, cans, drums, tanks and toys. A piece of softened plastics (frequently polyethylene) tubing is extruded and introduced into a two-piece blow-mould. As the mould is closed it presses one end of the tubular section together thus sealing it. Compressed air is blown into the other end of the tube until it fits against the cooled mould and solidifies. The mould is then opened and the article is removed.

Thermoforming is a process for making shaped articles such as bowls or beakers from plastic sheeting or film. The sheeting or film is heated with infra-red radiation to a temperature of between 120° and 180° (248° to 356° F.) until it is soft. It is then sucked against single-section mould by applying a vacuum. After cooling (solidifying), the moulded article is separated from the remainder of the sheet.

In rotational moulding, plastics powder is placed in a heated hollow mould of metal and the latter is rotated slowly about two axes which are perpendicular to each other. In this way the powder melts and is distributed evenly over the whole inner surface of the mould. After cooling, the mould is opened and the moulded hollow articles is removed.

Thermosetting resins may also be used in quanities found in plastic containers. Thermosetting plastics are not commonly used for packing due to the high cost of fabrication. The small quanities used are welcomed in the granulated mix.

Resins such as polyethylene have a stable molecular structure and survive many years under severe atmospheric conditions. This fact makes them useful for many outdoor applications such as boat docks and fence posts.

THE INVENTION IS CARRIED OUT AS FOLLOWS

The empty plastic containers with labels outside and residue inside are passed through a standard plastic granulator and reduced to small pieces resembling multicolored sawdust. Sand coated with melted STYROFOAM fluff is mixed with the granulated plastic and heated to form useful objects.

STYROFOAM fluff is prepared by obtaining used foamed polystyrene objects and tearing small individual pieces away from the foamed polystyrene surface.

Cutting, chopping and granulating closes the hollow cells which form the foamed polystyrene body. Cutting or chopping increases the specific gravity and sectional density of the chopped STYROFOAM mass.

The pulling and tearing away individual pieces of STYROFOAM reduces the specific gravity and sectional density of the STYROFOAM fluff. A cubic foot of STYROFOAM fluff may weight less than onefourth that of a cubic foot of the STYROFOAM from which the fluff was made.

Foamed polystyrene fluff is prepared as follows: New, scrap or reclaimed foamed polystyrene is subjected to a moving router member, 1 FIGS. 2 and 3. The surface of the foamed polystyrene is placed against the router projections, 2 FIG. 2, which are rotating. The foamed polystyrene surface is ruptured and small pieces are torn away by the moving projections, 2 FIG. 2. The tearing projections are moving at a speed of from 100 feet to 2,000 feet per minute. A plurality of tearing members, 1 FIG. 3, are placed around a cylinder, 2 FIG. 3, which is rotated about its center, 3 FIG. 3. The space between the tearing projections, 3 FIG. 2, may be circular or square The position of the tearing projections are different on each tearing member, 1 FIG. 3. In this way the second, tearing projections will pass through the space left between the first projections, 3 FIG. 2. The edges of the projections, 2 FIG. 2, need not be sharpened as the soft foamed polystyrene cells are easily opened and torn away. Cutting is not desired as tearing increases the volume of the fluff. The width of the projections, 2 FIG. 2, is from 0.5 millimeter to 3.0 millimeters. Small projections and higher speed provide a finer fluff.

STYROFOAM fluff is useful as filling for pillows, floats, padding, high quality insulation, sound absorber, and other applications requiring very light weight filler. STYROFOAM fluff is useful as artificial snow and flock for decorations. STYROFOAM fluff may be mixed with sand in amounts of one-half (0.5) to ten (10.) parts STYROFOAM fluff to sand by volume. The sand and fluff are mixed and heated to 200° C. to 250° C. with continuous agitation. The styrofoam fluff melts and collapses around the sand surfaces forming an adhesive layer on the sand particle.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above construction and methods without departing from the scope of the invention, it is intended that all matter contained in the above description shall be interpreted as illustrative and not in a limiting sense.

I claim:

1. A method of making a foamed polystyrene fluff comprising providing new, scrap, or reclaimed foamed polystyrene, placing the surface of the foamed polystyrene against rotating router projections each having width of from 0.5 millimeters to 3.0 millimeters and moving at a speed of from 100 feet to 2,000 feet per minute, and allowing the moving projections to rupture the foamed polystyrene surface and tear away pieces of the foamed polystyrene forming a foamed polystyrene fluff.

2. A method of making foamed polystyrene fluff from foamed polystyrene comprising placing foamed polystyrene against a moving router member having a plurality of tearing projections and allowing the tearing projections to rupture the foamed polystyrene surface and tear away irregular shaped pieces of the formed polystyrene forming foamed polystyrene fluff.

3. A method as in claim 2 wherein the foamed polystyrene has been reclaimed.

4. A method of making expanded polystyrene into expanded polystyrene fluff comprising providing a plurality of tearing members positioned around a cylinder, rotating the cylinder and tearing members, subjecting the surface of the expanded polystyrene to the rotating tearing members, and allowing the rotating tearing members to rupture the expanded polystyrene surface and tear away irregular pieces of the expanded polystyrene, forming expanded polystyrene fluff having a density less than the expanded polystyrene from which the expanded polystyrene fluff was made.

5. A method as in claim 4 wherein the expanded polystyrene has been reclaimed.

* * * * *